A. SLAUGHTER,

Assignor to C. W. THOMPSON.

CHEESE VAT.

No. 10,046 Reissued Feb. 28, 1882.

WITNESSES=

Chas. O. Raymond

S. G. Nottingham

INVENTOR=

Alanson Slaughter by J. R. Nottingham Atty.

N. PETERS, Photo-Lithographer, Washington, D. C.

UNITED STATES PATENT OFFICE.

ALANSON SLAUGHTER, OF MIDDLETOWN, ASSIGNOR TO CHARLES W. THOMPSON, OF THERESA, NEW YORK.

CHEESE-VAT.

SPECIFICATION forming part of Reissued Letters Patent No. 10,046, dated February 28, 1882.

Original No. 61,959, dated February 12, 1867. Application for reissue filed May 28, 1881.

*To all whom it may concern:*

Be it known that I, ALANSON SLAUGHTER, of Middletown, in the county of Orange and State of New York, have invented an Improved Cheese-Vat; and I do hereby declare that the following is a full, clear, and exact description of the same, reference being had to the accompanying drawings, of which—

Figure 1:
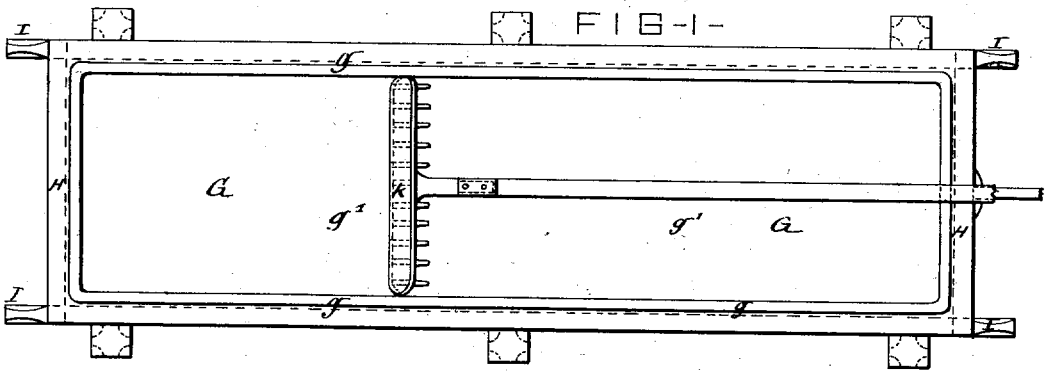
Figure 2:
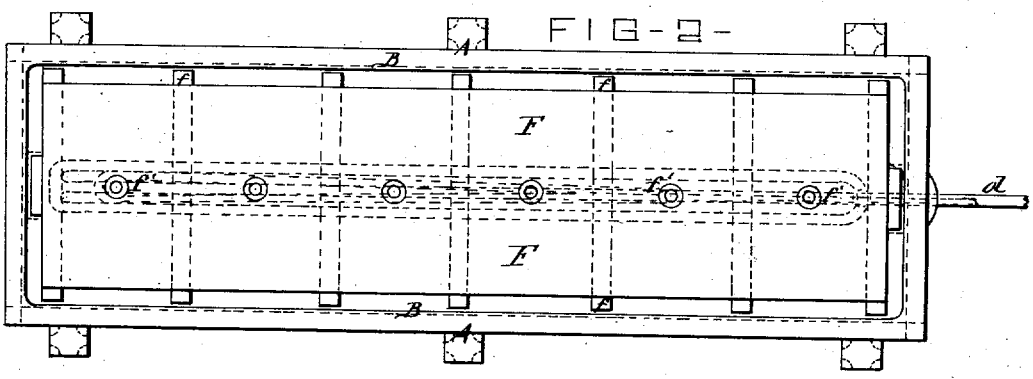
Figure 3:
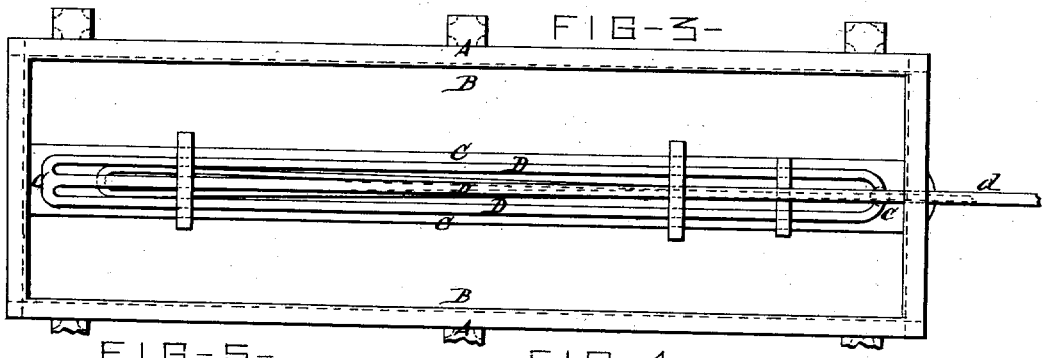
Figure 5:
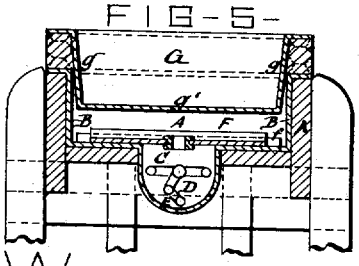
Figure 4:
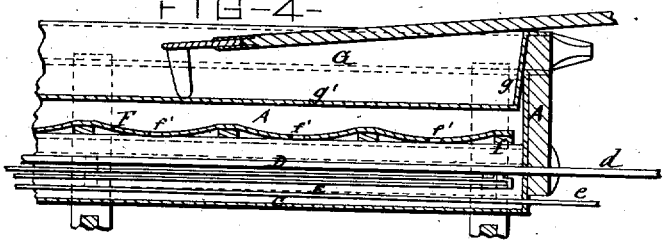

Figure 1 is a top view. Fig. 2 is a top view with milk-vat removed, showing disseminator; Fig. 3, a top view with disseminator removed; Fig. 4, a longitudinal section; Fig. 5, a transverse section.

The nature of my invention consists in constructing a cheese-vat so that the heat intended to coagulate or curdle the milk shall be conveyed through a body of water, aided by a corrugated disseminator, and thus be equally distributed beneath the under surface or bottom of the milk-vat; and this I accomplish by placing below the milk-vat a trough which I partially fill with water, said trough having an open recess running lengthwise for the reception of a series of pipes through which steam is admitted for the purpose of heating the water to the desired temperature, and also for a series of pipes through which the condensed steam is conveyed from the steam-pipes and trough; and thus I obtain the desideratum for cheese-making.

Having described the nature of my invention, I will now describe its construction and operation.

In the drawings, A is an ordinary trough with metallic or other lining, B, for containing the water through which heat is to be conveyed to the milk-vat.

C is a segmental recess running lengthwise of and projecting below the bottom of the trough for the reception of a series of steam-pipes, D, which course around in the recess C, and have a steam-entrance at *d*, outside the trough.

E is another series of pipes parallel and connected with the steam-pipes in said recess, and it conveys the condensed steam and water outside the trough by a pipe, *e*.

F is the corrugated disseminator, sustained by rods *f* at the swell of each corrugation, while in the hollow of each corrugation there is a circular aperture, *f'*, through which the lower trough communicates with the central portion of the water-space above the disseminator. This disseminator is smaller in extent than the interior of the trough, affording the heat a chance to pass all around and between it and the sides of the trough to the bottom of the milk-vat.

G is the milk-vat, which is composed of a frame, H, having handles I I, and a metallic or other suitable lining, *g*, which forms the interior of the vat, and is so constructed that while the frame H rests on the trough and makes a steam-tight joint with it, the bottom *g'* projects downward into the trough and water contained therein to receive its heat for coagulation of the milk in said vat.

K is the serrated agitator, used by the operator for the purpose of keeping the curd in motion and cutting the same during coagulation.

The operation is as follows: I first fill the milk-vat G with milk. I next pour the water into the trough through a pocket on one end of the same. I then admit the steam through the pipe *d*, and when the temperature is about 84° Fahrenheit I apply rennet sufficient to produce coagulation of the milk in from thirty to forty minutes. I now use the agitator K for the purpose of agitating and cutting the curd until it is of the proper size; and when the curd assumes the temperature of about 98° Fahrenheit I shut off the steam and allow the curd to remain in the vat G until the required amount of lactic acid has developed in the curd, when I draw off the whey, salt the curd, and remove the same to the press.

What I claim as my invention, and desire to secure by Letters Patent, is—

1. The herein-described cheese-vat, consisting of the combination of a milk-pan removably seated within a water-trough, said trough having steam-pipes entering below the water-line thereof, adapted to transmit steam-heat from a separate external generator through water contained in said trough to the aforesaid milk-pan, substantially as shown, and for the purpose specified.

2. The improved cheese-vat, consisting of a milk-vat removably seated within a water-trough, and having its vertical sides surrounded by the sides of said water-trough, having a water-space between them, and steam-pipes entering the water-trough, below the water-line thereof, for the purpose of gradually and uniformly heating the water surrounding the bottom and vertical sides of the milk-vat, substantially as set forth.

3. The combination, with the milk-vat G, of the water trough A B, having projecting below its bottom the open segmental recess C, and the steam-pipes D, and drip-pipes E, arranged within said recess, substantially as set forth.

4. In combination with the milk-vat G, water-trough A B, and steam-pipes D *d*, arranged as described, the corrugated disseminator F, having passages between it and the sides of the water-trough A, and provided in its depressed parts with apertures *f'*, substantially as and for the purpose specified.

5. The combination of the milk-vat G, hot-water trough A B, with its recess C, steam and drip pipes D E, arranged therein, the corrugated disseminator F, and agitator K, substantially as and for the purpose herein specified.

In testimony whereof I have hereunto signed my name and affixed my seal, in the presence of two attesting witnesses, at Middletown, in the county of Orange, in the State of New York, this 10th day of May, 1881.

ALANSON SLAUGHTER. [L. S.]

Witnesses:
HENRY W. WIGGINS,
ALDIS DE LEWEE ROSS.